Jan. 22, 1963     C. E. SEARIGHT     3,074,257
METHOD AND APPARATUS FOR MAKING GLASS BEADS
Filed May 16, 1960
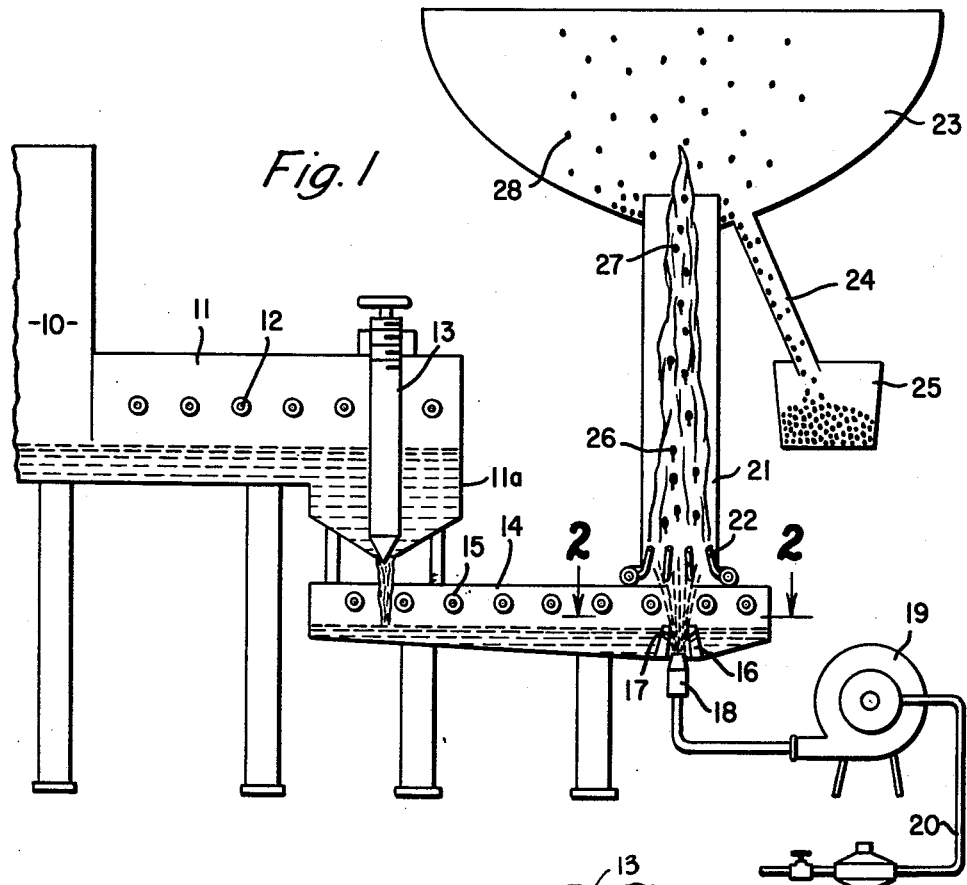
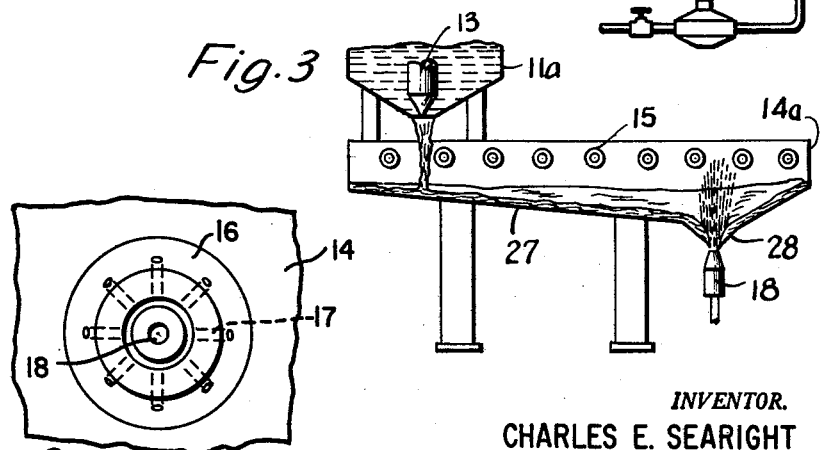
INVENTOR.
CHARLES E. SEARIGHT
BY
Malcolm W. Fraser
ATTORNEY 3,074,257
**METHOD AND APPARATUS FOR
MAKING GLASS BEADS**
Charles E. Searight, Jackson, Miss., assignor to Cataphote
Corporation, Toledo, Ohio, a corporation of Ohio
Filed May 16, 1960, Ser. No. 29,311
6 Claims. (Cl. 65—21)

This invention relates to the manufacture of macroscopic glass beads and particularly to a method and apparatus for the production thereof.

An object is to produce a simple and efficient method for producing such glass beads from molten glass in such manner that true spherical beads are produced on a quantity basis at a minimum of trouble and expense and employing vertically disposed blast flame.

Another object is to produce new and improved apparatus for carrying out the above method.

Other objects and advantages of the invention will hereinafter appear, and for purposes of illustration but not of limitation, embodiments of the invention are shown on the accompanying drawings in which—

FIGURE 1 is a schematic view showing an apparatus employed in the making of glass beads;

FIGURE 2 is an enlarged fragmentary view substantially on the line 2—2 of FIGURE 1; and FIGURE 3 is a fragmentary sectional view of an alternate form of apparatus.

The illustrated embodiment of the invention shown on FIGURES 1 and 2 comprises a glass melting tank 10 from which the molten glass passes to a laterally disposed tank or feeder conditioner 11 where a satisfactory temperature is maintained by a series of gas burners 12. The temperature of glass within the tank 11 is dependent upon the normal batch melting temperature of the glass employed and varies between 800° F. and 3000° F. The feeder conditioner 11 at its forward end has a depending well 11a, the bottom of which is cone-shaped and is apertured to receive the cone-shaped lower end of an adjustable needle valve 13 whose purpose is to regulate the flow of molten glass from the feeder conditioner to a super heater tank 14 which is disposed therebeneath. The tank 14 is heated by a series of gas burners 15 for the purpose of elevating the temperature of the glass above 2400° F. or as high as required for the specific glass formulation.

It will be understood that the temperature of the glass in the tank 14 is substantially above the temperature of the glass in the tank 11 and in no case is that temperature less than the temperature required to reduce the viscosity of the molten glass below log 3 on a typical temperature versus viscosity curve for the particular glass composition employed.

The bottom of the supper heater tank 14 slopes downwardly to the right-hand end portion which is provided with a frusto-conical weir or dam 16, the upper end of which is disposed above the level of the molten glass within the tank 14. Near the upper end portion of the weir 16 is an annular series of downwardly inclined relatively small passages 17, sufficiently small so that a ring of molten glass flows therethrough into the stream of a high velocity and high temperature frame emitted from a burner nozzle 18 disposed in close juxtaposition thereto. The flame from the burner 18 should wipe the inside walls of the weir 16. The burner nozzle 18 is connected by suitable piping to a standard premix type unit 19 in the nature of a blower for mixing air and gas from a pipeline 20.

The flame velocity at the nozzle 18 should be in excess of one thousand feet per second and preferably in the range of two thousand to six thousand feet per second dependent upon the size of beads desired and the viscosity of the glass. The lower the viscosity of the glass composition employed, the lower will be the flame velocity. The higher the flame velocity for given glass composition, the smaller will be the beads produced.

It should be understood that a static head of molten glass is maintained within the tank 14 which is just sufficient to overcome the upward pressure created by the high velocity flame from the burner nozzle 18. If the static head is not maintained in this manner, it will be manifest that the upward pressure of the burner flame would prevent the desired flow of glass through the weir.

Disposed upon the super-heater tank 14 and concentric with the nozzle 18 is a vertical stack 21, preferably cylindrical, and at the base of the stack is an annular series of burners 22 for providing a relatively long flame which fills the stack 21 for a purpose hereinafter to be described. The height of the stack 21 varies proportionately to the viscosity of the glass employed. It is inversely proportional to the surface tension as is well known in the industry. At the upper end of the stack is a bowl-shaped collector 23 into which the stack extends. A downwardly and outwardly inclined discharge pipe 24 extends from the collector 23 to a container 25.

It will be understood that the molten glass which has been elevated to the desired temperature flows through the small downwardly inclined ports or passages 17 in the weir 16 where the very thin layer is contacted by the flame from the burner 18 which is at high velocity as well as high temperature, thereby fragmentizing the thin stream of glass from the ports 17 and blowing these fragments upwardly into the stack 21. At first these fragments are partly spherical and partly formed with tails in a comet-like fashion as indicated at 26. These are disposed within the long flame emitted from the burners 22 which maintains the glass fragments or particles in melted condition until the surface tension of the glass itself is sufficient to overcome the viscosity of the glass and retract the tails into the bead or sphere, thus forming a truly spherical particle at the upper end portion of the stack, as indicated at 27. After being blown from the stack, the particles 28 will have left the hot gas-air stream and cooled by the air sufficiently to be solid and will not be deformed when falling by gravity upon the collector 23. These particles or spheres are sufficiently solid and cooled to be able to flow by gravity through the chute into the receptacle 25.

By providing an extremely thin stream of glass from the weir 16 one of the difficulties hereinbefore encountered is overcome. Heretofore a stream of glass from ¼" to ½" in diameter flowed from a heated tank and then this solid stream of glass was fragmentized by a high velocity air or flame jet. The large stream of glass necessitated in such instance was objectionable because in such stream the glass was so cohesive that fragmentizing was extremely difficult. However in accordance with this invention a thin stream of glass in ring-like formation and of such small cross-section is provided that fragmentizing is made possible on a production basis. Further by arranging the high pressure air-gas flame in a vertical manner, it is possible to have the hot air-gas mixture travel in the same direction as and along with the glass particles which it has fragmentized from the main body of glass.

Another important feature resides in the confinement of the glass particles within the stack 21 which is filled with gas and hot air-gas mixture from the burner arrangement 22. The high velocity flame eminating from the burner 18 is necessarily relatively short due to the high oxygenation rate required in order to obtain the necessary velocity and heat. Thus this is supplemented by the burner arrangement 22 which affords a long flame substantially filling the inside of the stack 21 and serves to extend the time which, because of the time-temperature relationship of glass, viscosities and surface tensions greatly facilitate the spherulizing of the fragments. The temperature of the flame from the burner 22 is sufficiently high to maintain the glass above its fusion temperature during the major portion of its travel through the stack 21. If the continuing heat is maintained for a sufficient period of time, the stack 21 may be dispensed with.

The alternate form shown in FIGURE 3 in similar to that above described except that the super heater tank 14a has a downwardly inclined bottom wall 27 which leads to a cone-shaped well 28 at the right hand end portion through which the high velocity flame from the burner 18 projects as in the form according to FIGURES 1 and 2. This form also forms a ring of glass which is fragmentized by the blast from the frame. It is to be understood that the bottom wall 27 is so formed as to permit a rate of flow of the molten glass sufficient that the velocity of the stream would be adequate to overcome the upward pressure generated by the flame blast from the nozzle 18, thus to enable the entry of the glass into the path of the flame.

Numerous changes in details of construction, arrangement and operation may be effected without departing from the spirit of the invention, especially as defined in the appended claims.

What I claim is:

1. The method of making macroscopic glass beads which consists in flowing molten glass to a vertical orifice for forming a ring of glass therein, introducing a vertical blast flame into the base of the orifice to fragmentize the molten glass and propel the fragments upwardly, enclosing the upwardly propelled glass fragments within a heated atmosphere above the fusion point of the glass to cause the fragments to spherulize to form beads, cooling the beads, and collecting the beads.

2. The method of making macroscopic glass beads which consists in forming a pool of molten glass, flowing glass from the pool through a vertical orifice at the bottom of the pool, introducing a vertical blast flame into the base of the orifice to fragmentize the molten glass and propel the fragments upwardly, enclosing the upwardly propelled glass fragments within a heated atmosphere above the fusion point of the glass to cause the fragments to spherulize to form beads, cooling the beads, and collecting the beads.

3. The method of making macroscopic glass beads which consists in forming a pool of molten glass, flowing glass from the pool through a vertical orifice at the bottom of the pool introducing a vertical blast flame into the base of the orifice to fragmentize the molten glass and propel the fragments upwardly, maintaining a sufficient static head in the pool to militate against the force of the flame blast interfering with glass flow from the pool, enclosing the upwardly propelled glass fragments within a heated atmosphere above the fusion point of the glass to cause the fragments to spherulize to form beads, cooling the beads, and collecting the beads.

4. Apparatus for making macroscopic beads comprising a tank for molten glass, means for flowing molten glass to the tank, means to heat the tank, an orifice in the bottom of the tank, a weir in the tank in registry with the orifice and having apertures in the walls thereof for forming a ring of molten glass on the inside thereof, means to provide an upwardly directed blast flame through and beyond the weir for fragmentizing the glass and propel the same upwardly, and means for maintaining an upwardly extending heated zone through which the fragmented particles of glass are propelled.

5. Apparatus for making macroscopic beads comprising a tank for molten glass, means for flowing molten glass to the tank, means to heat the tank, an orifice in the bottom of the tank, a weir in the tank in registry with the orifice and having apertures in the walls thereof for forming a ring of molten glass on the inside thereof, means to provide an upwardly directed blast flame through and beyond the weir for fragmentizing the glass and propel the same upwardly, a stack above the tank to receive the glass fragments, means to provide a relatively long flame in the stack through which the fragments pass and are spherulized, and means to collect the spherulized beads.

6. Apparatus for making macroscopic beads comprising a tank for molten glass having a downwardly sloping bottom, means for flowing molten glass to the tank to provide a relatively thin stream on the sloping bottom, means to heat the tank, an orifice in the bottom of the tank into which a thin ring flows, means to provide an upwardly directed blast flame through and beyond the orifice for fragmentizing the glass and propel the same upwardly, and means for maintaining an upwardly extending heated zone through which the fragmented particles of glass are propelled.

References Cited in the file of this patent

UNITED STATES PATENTS

| | | |
|---|---|---|
| 1,950,932 | Schott | Mar. 13, 1934 |
| 2,338,473 | Von Pazsicsky | Jan. 4, 1944 |
| 2,619,776 | Potters | Dec. 2, 1952 |
| 2,814,832 | Stephens | Dec. 3, 1957 |
| 2,838,881 | Plumat | June 17, 1958 |
| 2,965,921 | Bland | Dec. 27, 1960 |
| 3,015,127 | Stalego | Jan. 2, 1962 |